United States Patent [19]

Ohta

[11] 4,366,742
[45] Jan. 4, 1983

[54] HYDRAULIC FORCE MULTIPLYING DEVICE

[75] Inventor: Yoshimoto Ohta, Ichikawa, Japan

[73] Assignee: Tokico Ltd., Kawasaki, Japan

[21] Appl. No.: 139,220

[22] Filed: Apr. 11, 1980

[30] Foreign Application Priority Data

Apr. 16, 1979 [JP] Japan .......................... 54-50323[U]
Apr. 20, 1979 [JP] Japan .......................... 54-53099[U]

[51] Int. Cl.³ .......................... F15B 9/10; F16J 1/10
[52] U.S. Cl. .......................... 91/49; 91/372;
91/431; 92/129
[58] Field of Search .......................... 91/49, 431, 372;
92/129

[56] References Cited

U.S. PATENT DOCUMENTS

| | | | |
|---|---|---|---|
| 3,327,590 | 6/1967 | Johnson | 91/49 |
| 3,402,592 | 9/1968 | Machon et al. | 92/129 |
| 3,444,784 | 5/1969 | Wengerd | 92/129 |
| 4,135,435 | 1/1979 | Adachi | 91/49 |
| 4,179,980 | 12/1979 | Kito et al. | 91/49 |

FOREIGN PATENT DOCUMENTS 741199 11/1943 Fed. Rep. of Germany .......... 91/49

*Primary Examiner*—Paul E. Maslousky
*Attorney, Agent, or Firm*—Wenderoth, Lind & Ponack

[57] ABSTRACT

A hydraulic force multiplying device comprising a main body having inlet and outlet ports, input and output rods with one ends thereof being slidably connected with one another in the main body, an annular piston slidably engaging with the inner circumference of the main body and the outer circumference of the input rod and being associated with the output rod, two liquid chambers partitioned by the piston and connected respectively to the inlet and outlet ports, a connecting passage connecting the two liquid chambers, a valve mechanism provided between the input rod and the output rod for controlling the liquid flow passing through the connecting passage, and a by-pass passage provided between the piston and the input rod for connecting the two liquid chambers in the non-actuated condition of the device.

4 Claims, 6 Drawing Figures

HYDRAULIC FORCE MULTIPLYING DEVICE

BACKGROUND OF THE INVENTION

This invention relates to hydraulic force multipling devices.

Various hydraulic force multiplying devices have been proposed to reliably actuate a braking system of a vehicle with a relatively small input force by utilizing hydraulic pressure to multiply the input force thereby generating a large output force.

One of the prior art hydraulic force multiplying devices includes a main body having an inlet port connected to a source of hydraulic pressure and an outlet port connected to means such as a reservoir of hydraulic fluid, an input rod and an output rod with the respective one ends thereof being disposed in the main body and connected slidably with one another, an annular piston slidably engaging with the inner circumference of the main body and with the outer circumference of the input rod, an inlet side liquid chamber and an outlet side liquid chamber defined in the main body and partitioned by the piston, a connecting passage formed in the input rod for connecting the two liquid chambers, and a valve mechanism provided between the input and output rods. The valve mechanism restricts the fluid flow passing through the connecting passage when an input force is applied to the input rod to displace the input rod toward the output rod thereby generating a differential pressure across the piston. The differential pressure force acting on the piston is transmitted to the output rod.

However, there is a shortcoming in the hydraulic force multiplying device having the construction as described heretofore in that the differential pressure will not be established very early across the piston in the initial stage of the actuation of the device so that there is a delay between the application of the input force and the generation of the output force and thus the operator will feel uneasy. Further, when the valve mechanism consists of a rigid valve seat formed on either the input or the output rod and a rigid valve member provided on the other of the input and ouptut rods, the valve member will sometimes engage with the valve seat with an impact thus generating noise and impairing the operational feeling of the device.

SUMMARY OF THE INVENTION

One of the objects of the present invention is to provide a hydraulic force multiplying device overcoming the shortcomings described above. According to the invention, there is provided a by-pass passage between the input rod and the piston for connecting the liquid chambers on the opposite sides of the piston in the non-actuated condition of the device, and the by-pass passage is closed when the input rod is displaced with respect to the piston in the initial stage of the actuation of the device.

BRIEF DESCRIPTION OF THE DRAWINGS

Further objects and advantages of the present invention will now be explained, in conjunction with the accompanying drawings illustrating some embodiments of the invention.

In the drawings.

DETAILED DESCRIPTION OF THE PREFERRED EMBODIMENTS

Figure 1:
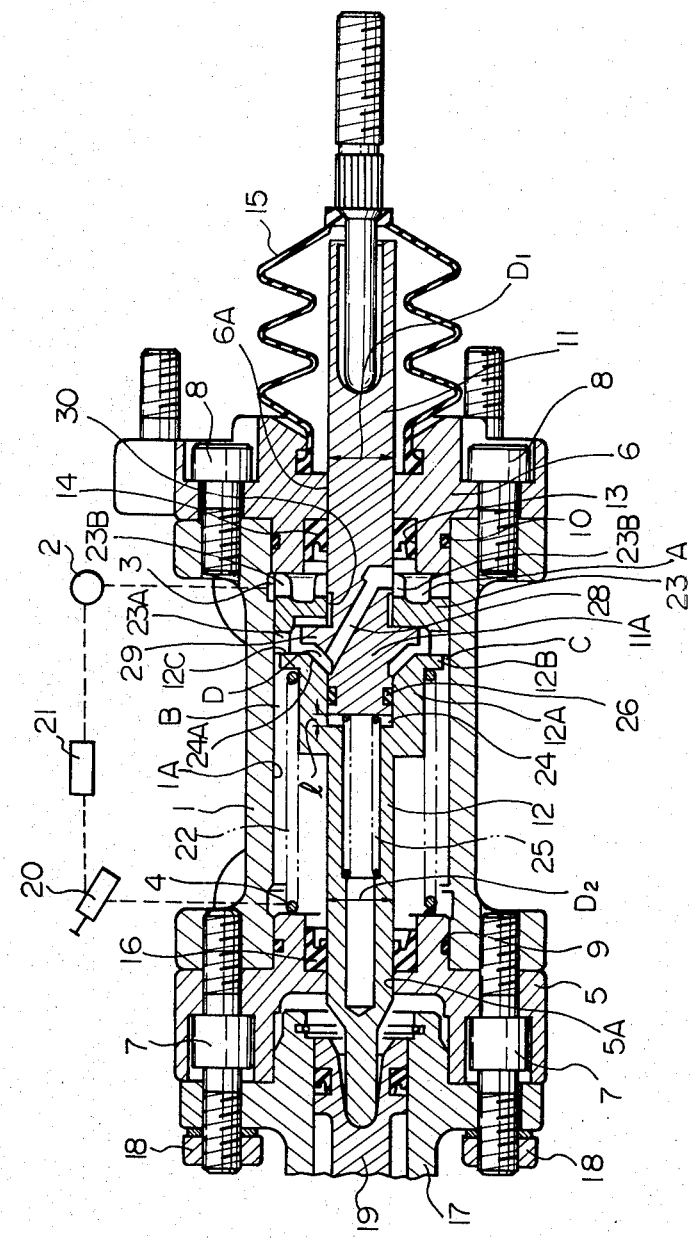
FIG. 1 is a longitudinal sectional view of a hydraulic force multiplying device according to the invention.

The hydraulic force multiplying device illustrated in FIG. 1 comprises a main body 1 defining therein a cylinder 1A. On the opposite ends of the cylinder 1A, there are formed an inlet port 3 connected to a source of hydraulic pressure 2 and an outlet port 4. The opposite ends of the cylinder 1A are closed respectively by closure members 5 and 6 which are secured to the main body 1 by bolts 7 and 8 respectively. Seal rings 9 and 10 seal the gap between the cylinder 1A and the closure members 5 and 6.

An input rod 11 is slidably supported in a guide bore 6A of the closure member 6, and an output rod 12 is slidably supported in a guide bore 5A of the closure member 5. Respective one ends 11A and 12A of the input and output rods 11 and 12 are disposed in the cylinder 1A and slidably engaged with one another. The diameter $D_1$ of the input rod 11 or of the guide bore 6A is equal to the diameter $D_2$ of the output rod 12 or of the guide bore 5a. A recess or counterbored portion 13 is formed in the closure member 6 to receive therein a cup seal 14 for sealing around the outer circumference of the input rod 11. A dust boot 15 covers and protects a portion of the input rod 11 projecting out of the main body 1. The opposite ends of the dust boot 15 are secured respectively to the closure member 6 and the input rod 11.

A cup seal 16 is provided between the output rod 12 and the closure member 5. In the embodiment of FIG. 1, a master cylinder 17 of a braking system is secured to the main body 1 by bolts 7 and nuts 18, and a piston 19 of the master cylinder 17 is actuated directly by the output rod 12.

The outlet port 4 in the main body 1 is connected through a hydraulic actuator 20 with a hydraulic reservoir 21 which supplies hydraulic fluid to the source 2 of hydraulic pressure. In the embodiment of FIG. 1, the hydraulic actuator 20 is an actuator for a power steering apparatus, and the source 2 is a hydraulic pump.

A spring 22 is disposed between the closure member 5 and the inner end 12A of the output rod 12 to bias the output rod 12 in the rightward direction as viewed in FIG. 1. An annular piston 23 is slidably fitted in the cylinder 1A or the inner circumference of the main body 1 and also is slidably fitted on the outer circumference of the input rod 11. The piston 23 divides the interior of the main body 1 into an inlet side liquid chamber A and an outlet side liquid chamber B.

A recess 24 is provided in the inner end 12A of the output rod 12 to slidably receive therein the inner end 11A of the input rod 11. A seal ring 26 is provided between the inner end 11A and the recess 24. A spring 25 is positioned between the input and output rods for acting in a direction to separate them from one another. In the non-actuated condition illustrated in the drawing, there is formed an axial space 1 between the input rod 11 and the output rod 12 to allow the relative displacement therebetween in the direction toward each other.

The inner end 12B of the inner end portion 12A of the output rod 12 has an enlarged diameter. A space C is provided between the inner surface of the cylinder 1A and the radially outer surface of the end 12B. A radially extending surface 12C is formed on the end 12B of the output rod 12 and the radially outer portion of which engages with the piston 23 so as to receive therefrom a differential pressure force acting on the piston 23.

A valve seat 24A is defined on the radially inner portion of the surface 12C of the output rod 12, and the valve seat 24A cooperates with a flange-like shaped valve member 29 formed on the input rod 11 for controlling liquid flow passing through a connecting passage 28 which is formed in the input rod 11 and which will be described hereinafter.

A plurality of cut-out portions 23A are provided on the left side surface of the piston 23 to constitute a portion of the liquid chamber B. Also, a plurality of cut-out portions 23B is formed on the opposite side surface of the piston 23 to form the liquid chamber A.

A valve chamber D is defined by the inner peripheral surface of the output rod 12 at the location contiguous to and radially inwards of the valve seat 24A and the outer peripheral surface of the input rod 11 at the location contiguous to and radially inwards of the valve member 29. The connecting passage 28 formed in the input rod 11 connects the liquid chamber A with the valve chamber D.

A by-pass passage 30 is formed between the input rod 11 and the piston 23. In the embodiment of FIG. 1, a plurality of axially extending grooves is formed in the outer peripheral surface of the input rod 11 with the axial length thereof being greater than the thickness of the piston 23 so that, in the non-actuated condition of the device, the passage 30 connects the liquid chambers A and B. When the input rod 11 is displaced leftward in the drawing in the initial stage of the actuation of the device. The cross-sectional areas of the by-pass passage 30 and the connecting passage 28 are such that when the passages 30 and 28 are opened liquid flows freely through the passages and no pressure difference will be generated between the liquid chambers A and B, and such that when the by-pass passage 30 is closed, a substantial pressure difference will be generated across the piston 23.

In the non-actuated condition illustrated in the drawing, the piston 23 is urged against the closure member 6 by the spring force of the spring 22, and the input rod 11 is biassed in the rightward direction by the spring 25 to engage with the piston 23. The by-pass passage 30 connects the liquid chambers A and B, and the connecting passage 28 connects the chambers A and B through the valve chamber D. The outer diameter $D_1$ of the input rod 11 is equal to the outer diameter $D_2$ of the output rod 12, thus the force acting on the input rod 11 to bias it outwards is equal of the force acting on the output rod 12 irrespective to the pressure in the cylinder 1A.

Hydraulic fluid supplied from the source 2 passes through the inlet port 3, the liquid chamber A, the connecting passage 28 and the valve chamber D, the by-pass passage 30, the liquid chamber B, and the outlet port 4 and, thereafter, returns to the reservoir 21 through the power steering system 20.

When the driver of a vehicle actuates the input rod 11 by e.g. depressing a brake pedal, the input rod 11 moves leftward slightly against the spring force of the spring 25 in the initial stage of the actuation. Since the spring 22 is stronger than the spring 25 the input rod 11 is displaced leftward with respect to the output rod 12 and the piston 23 which are at a standstill at this stage. The by-pass passage 30 closes accordingly, whereby the liquid chambers A and B are connected only through the connecting passage 28. Due to the throttling effect in the passage 28, a pressure difference is generated between the liquid chambers A and B. The differential pressure acting on the piston 23 is transmitted to the output rod 12. At this stage, the valve seat 24A and the valve member 29 do not have any substantial throttling effect, and the pressure in the valve chamber D is nearly equal to that in the liquid chamber B. Therefore, no resisting force will act on the input rod 11.

Usually the resisting force such as the force of a return spring (not shown) acting on the piston 19 of the master cylinder 17 is larger than the output force generating on the output rod 12 at this stage so that the output rod 12 does not move. However, when the input force applied on the input rod 11 is further increased, the spring 25 further deflects and the valve member 29 further approaches the valve seat 24A thereby increasing the pressure difference between the chambers A and B. The output force acting on the output rod 12 increases. The pressure in the valve chamber D acts on the output rod 12 to augment the output force, and also acts on the input rod 11 thereby producing a pedal feeling to the driver. The ratio between the output force and the input force can be as desired by properly designing the pressure receiving area of the valve chamber 23 and the effective area of the piston 23.

Figure 2:
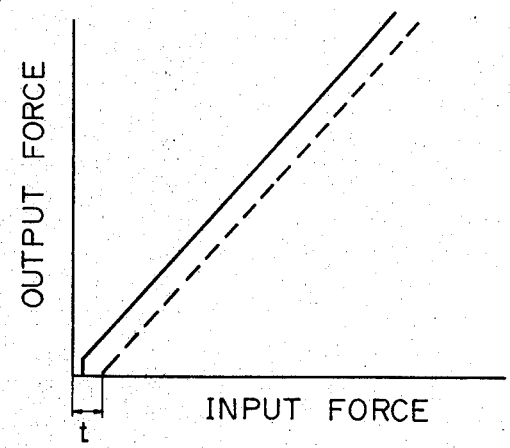
FIG. 2 is a diagram showing the relationship between the input force and the output force.

In FIG. 2, the input force-output force characteristic of the device of the invention is depicted by the full line as compared with that of the prior art device which is shown in the broken line. In the prior art device, there is a loss of power in the input force as shown by the letter t for generating the output force, since the spring 22 and the return spring in the master cylinder must be deflected before the clearance between the valve member and the valve seat are throttled sufficiently; in other words, the output force, is generated after a substantial pressure difference has been generated between the chambers D and B. According to the invention, the output force is generated when the by-pass passage 30 is closed with the pressure in the valve chamber D being nearly equal to that in the liquid chamber B. The output force jumps, as shown in the diagram, in the initial stage and, thereafter, faithfully follows the input force, thus, the pedal feeling is improved.

When the input force applied to the input rod 11 is decreased, the input rod 11 is displaced in the direction away from the output rod 12 due to the pressure in the valve chamber D. The clearance between the valve seat 24A and the valve member 29 increases thereby decreasing the pressure difference between the chambers A and B. The input rod 11 takes a position corresponding to the input force applied thereon, and the device takes an equilibrium position.

When the force acting on the input rod 11 is further decreased, the by-pass passage 30 opens to directly connect the chambers A and B, and the output rod 12, the piston 23 and the input rod 11 return to the initial positions due to the force of the springs 22 and 25.

Figure 3:
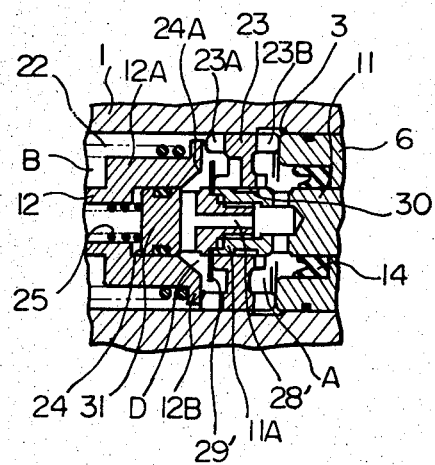
FIG. 3 is a longitudinal sectional view of the essential portion of a second embodiment of the present invention.

The embodiment of FIG. 3 is generally similar to the first embodiment and corresponding numerals have been applied to corresponding parts.

On the inner end 11A of the input rod 11, a retaining member 31 having the diameter equal to that of the inner end 11A is screw-threadedly secured to the inner end 11A with the inner periphery of a resilient annular valve member 29' being clamped and retained therebetween. A connecting passage 28' having a function similar to that of the connecting passage 28 of the first embodiment is formed in the retaining member 31 and the input rod 11 as shown in the drawing. The arrangement and function of by-pass passage 30 are similar to the by-pass passage of FIG. 1. The valve member 29' of the second embodiment is resilient, and thus, it is possible to avoid causing the valve member to abut the valve seat 24A with an impact even when the input rod 11 is displaced too quickly by depressing the brake pedal or when the input rod 11 is actuated while the pressurized liquid not being supplied to the device and, accordingly, it is possible to prevent the generation of the impact noise, to decrease vibrations, and to extend the service life of the valve member 29'.

Figure 4:
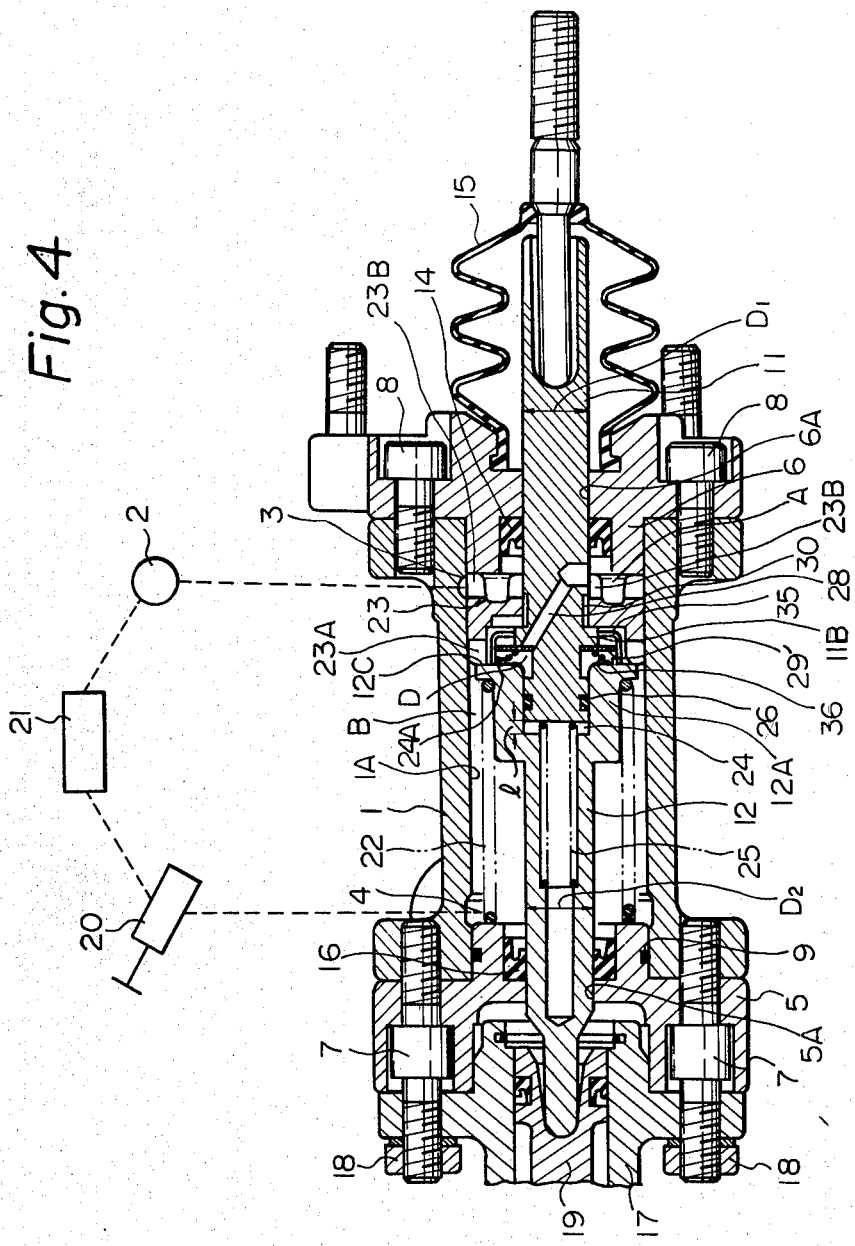
FIG. 4 is a longitudinal sectional view of a third embodiment of the invention.
Figure 5:
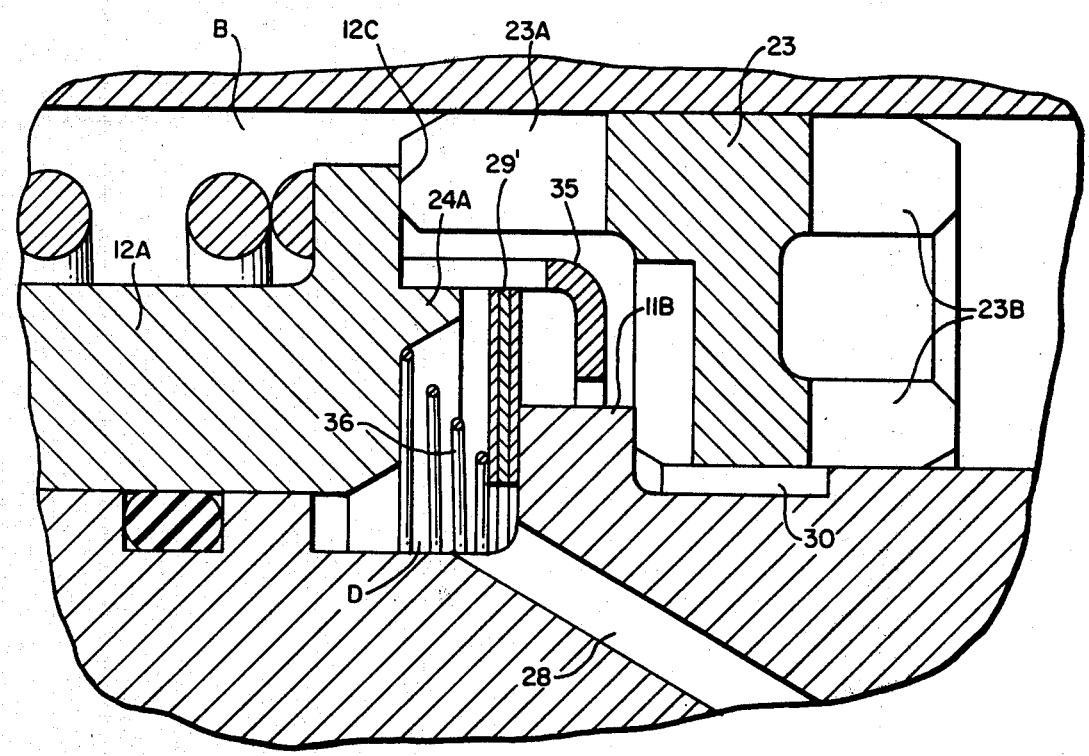
FIG. 5 is an enlarged sectional view of a part of the embodiment of FIG. 4.

The third embodiment illustrated in FIGS. 4 and 5 is generally similar to the preceding embodiments, and corresponding numerals have been applied to corresponding parts. An annular resilient disc or valve member 29' is mounted on the inner end portion of the input rod 11, and the inner circumferential portion of the valve member 29' is urged against a shoulder defined by a flange-like portion 11B of the input rod by means of a spring 36. A valve seat 24A coacting with the outer circumferential portion of the valve member 29' is defined by an annular projection projecting axially from the inner end surface 12C of the output rod 12. The outer diameter of the valve seat 24A is nearly equal to that of the valve member 29', and the valve seat 24A and the valve member 29' are covered by an annular guide member 35 secured to the output rod 12. The guide member 35 slidingly guides the valve member 29'.

A by-pass passage 30 is formed between the input rod 11 and the piston 23 with the arrangement and function thereof being similar to the first embodiment. The resilient valve member 29' of FIGS. 4 and 5 is supported slidably on the guide member 35, and is not rigidly mounted on the input rod 11. Thus, the valve member 29' can smoothly deflect with the inner and outer circumferential portions thereof engaging respectively with the shoulder on the flange-like portion 11B of the input rod 11 and the annular valve seat 24A on the output rod 12. The impact force can be reduced as compared with the embodiments of FIG. 3, thus improving further the pedal feeling.

Figure 6:
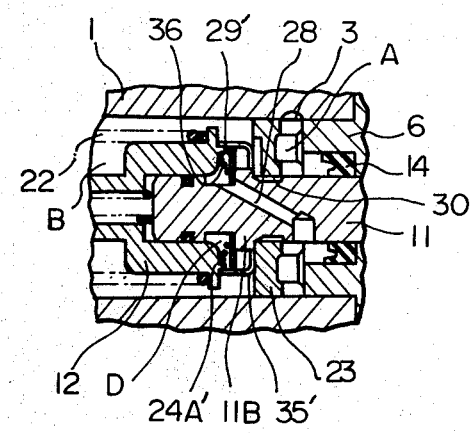
FIG. 6 is a longitudinal sectional view of the essential portion of a fourth embodiment of the invention.

The embodiment of FIG. 6 is generally similar to the embodiment of FIGS. 4 and 5, and corresponding numerals have been applied to corresponding parts. In the embodiment, the guide member 35' guiding the valve member 29' also acts to transmit the differential pressure force from the piston 23 to the output rod 12. The construction of the piston 23 is thus simplified as compared with the preceding embodiments.

The foregoing description was presented to show preferred embodiments of the invention, but it will be understood that various modifications may be made without departing from the spirit of the invention. For example, the valve member 29 or 29' may be provided on the output rod with the valve seat 24A being provided in connection with the input rod; the guide member 35 in FIGS. 4, 5 and 6 may be integrally formed on the input rod 11 or on the output rod 12 or on the piston 23 in the embodiment of FIG. 5; the piston 23 in respective embodiments may be secured to or integrally formed with the output rod 12; the spring 36 in FIGS. 4, 5 and 6 may be omitted; or the resilient valve member 29' in FIGS. 3, 4, 5 and 6 may be formed of two or more overlapping thin discs.

As described heretofore, the hydraulic force multiplying device according to the invention has "jumping up characteristics" in the input force—output force diagram wherein the loss in the input forces can substantially be avoided, and the correspondence between the input force and output force can be improved thereby improving the pedal feeling.

What is claimed is:

1. A hydraulic force multiplying device comprising:
    a main body having an interior and closed body ends and having inlet and outlet ports opening into said interior;
    input and output rods having portions of the same diameter sealingly and slidingly extending through the opposite body ends of the main body and having the inner ends thereof which are within said interior sealingly and slidingly connected with one another;
    an annular piston separate from said input and output rods and slidingly engaging with the inner circumference of the interior of the main body and slidable on the outer circumference of the input rod for being movable separately from said input rod and said output rod, said piston partitioning the interior of the main body into two chambers which are respectively connected to said inlet and to said outlet ports, said piston normally abutting said output rod, said input rod having a first passage therein for connecting said two chambers;
    a normally open valve associated with said first passage; and
    a bypass passage between the inner circumference of the piston and the outer circumference of the input rod for connecting said two chambers, said bypass passage being closed by the movement of said input rod in the initial stage of the actuation of the device.

2. A hydraulic force multiplying device as set forth in claim 1, wherein the valve member is an annular resilient disc slidably mounted for movement in the direction of the longitudinal axis of the device and between said input and output rods, and a guide member guiding the outer circumference of the disc in the direction of the longitudinal axis.

3. A hydraulic force multiplying device as set forth in claim 1 wherein the valve member is an annular resilient disc having the inner circumferential portion thereof being secured to one of said rods and the outer circumference thereof coacting with the other rod.

4. A hydraulic force multiplying device as set forth in claim 1 wherein the outer circumferential surface of the input rod has at least one axially extending groove therein constituting the by-pass passage, and the opposite ends of said groove open on the opposite sides of said annular piston in the non-actuated condition of the device.

* * * * *